United States Patent
Guillon et al.

Patent Number: 5,488,432
Date of Patent: Jan. 30, 1996

[54] VIDEO SIGNAL PROCESSING METHOD FOR CHANGING A VIDEO SIGNAL DISPLAY FORMAT

[75] Inventors: Jean-Claude Guillon, Gustheim; Laurent Perdrieau, Illkirch, both of France

[73] Assignee: Laboratoire Europeen de Recherches Electroniques Avancees Societe en Nom Collectif, Courbevoie, France

[21] Appl. No.: 361,172

[22] Filed: Dec. 21, 1994

Related U.S. Application Data

[63] Continuation of Ser. No. 130,412, Oct. 1, 1993, abandoned, which is a continuation of Ser. No. 726,336, Jul. 5, 1991, abandoned.

[30] Foreign Application Priority Data

Jul. 13, 1990 [FR] France ................... 90 08951

[51] Int. Cl.$^6$ .............. H04N 5/907; H04N 9/64
[52] U.S. Cl. ............ 348/717; 348/716; 348/445; 348/556
[58] Field of Search ............... 348/717, 714, 348/716, 445, 556

[56] References Cited

U.S. PATENT DOCUMENTS

| | | | |
|---|---|---|---|
| 4,163,248 | 7/1979 | Heitmann | 358/13 |
| 4,864,402 | 9/1989 | Ebihara et al. | 358/21 R |
| 4,942,457 | 7/1990 | Keesen et al. | 358/13 C |
| 5,005,073 | 4/1991 | Rufray et al. | 358/21 R |

FOREIGN PATENT DOCUMENTS

| | | |
|---|---|---|
| 0309875 | 4/1989 | European Pat. Off. . |
| 0371270 | 6/1990 | European Pat. Off. . |
| 0048591 | 3/1983 | Japan ............ 358/21 R |

OTHER PUBLICATIONS

N. T. Z. Archiv, vol. 10, No. 9, Sep. 1988, pp. 259–265, R. Luder, "Digital Videotechnik In Der Unterhaltungselektronik—Heute Und Morgen".

*Primary Examiner*—Curtis Kuntz
*Assistant Examiner*—Minsun Oh
*Attorney, Agent, or Firm*—Oblon, Spivak, McClelland, Maier & Neustadt

[57] ABSTRACT

The present invention concerns a processing method for a video signal coded in the form of blocks of K words, this signal being written to or read from two frame memories (FM1, FM2) each including an input port, a high speed output port and a low speed output port. According to this method, the input digital video signal is formed by sets of M' blocks with N' block containing luminance data (Y1, Y2 . . .) and M'–N' blocks containing chrominance data (C1, C2 . . .), the blocks containing the chrominance data (C1) are written in the first memory (FM1) and the blocks containing luminance data (Y1) are written in the second memory (FM2). Then the blocks containing the luminance data and the blocks containing the chrominance data are read simultaneously on the high speed output port of each memory, the memories being inverted at each frame, and the data eventually being processed to obtain video data in output that presents a compression ratio M/N with M>N.

16 Claims, 6 Drawing Sheets

FIG. 3A DATA FORMATTED AT INPUT

FIG. 3B DATA WRITTEN IN FM1

FIG. 3C INCREMENTATION OF THE HORIZONTAL COUNTER OF FM1

FIG. 3D DATA WRITTEN IN FM2

FIG. 3E INCREMENTATION OF THE HORIZONTAL COUNTER OF FM2

1 BLOCK = 12 SAMPLES

OUTPUT B OF FM1

INCREMENTATION
OF HORIZONTAL
COUNTER OF FM1

OUTPUT B OF FM2

INCREMENTATION
OF HORIZONTAL
COUNTER OF FM2

FIG. 6

VIDEO SIGNAL PROCESSING METHOD FOR CHANGING A VIDEO SIGNAL DISPLAY FORMAT

This application is a continuation of application Ser. No. 08/130,412, filed on Oct. 1, 1993, now abandoned, which is a continuation of application Ser. No. 07/726,336, filed on Jul. 5, 1991, now abandoned

BACKGROUND OF THE INVENTION

1. Field of the Invention

The present invention concerns a video signal processing method, more specifically a processing method which makes it possible to display a 4/3 format image on a 16/9 format television tube.

2. Discussion of the Background

Tubes with a 16/9 format image have only recently existed on the market. These tubes were developed for high definition applications. However, today we plan to equip televisions with this type of tube, namely television sets whose architecture was designed to be compatible with future standards. Yet, all currently broadcasted programs are in 4/3 format. To display a 4/3 format video image on a 16/9 tube, it is therefore necessary to process this image to eliminate distortion or anamorphosis problems during the display.

Different techniques have been developed to display a 4/3 image on a 16/9 format television tube. Hence, in the German P 37 22 172.8 patent application, techniques based on a combination of image vertical size variation (by changing the amplitude of the vertical deflection current) and by changing the horizontal image size with electronic means are used.

SUMMARY OF THE INVENTION

The present invention concerns a new processing method based on the use of picture frame memories as a means of storage.

Consequently, the object of the present invention is a processing method for a video signal coded in the form of blocks of K words, this signal being written to or read from two picture frame memories which each have an input port, a high speed output port and a low speed output port, characterized by the fact that the input digital video signal is formed by sets of M' blocks with N' blocks containing luminance data and M'–N' blocks containing chrominance data, and by the fact that the blocks containing chrominance data are written in the first memory and the blocks containing luminance data are written in the second memory, the memories being inverted at each frame and the blocks containing luminance data and the blocks containing chrominance data are read simultaneously on the high speed output port of each memory, the memories being inverted at each frame, and the data possibly being processed to obtain video data in output that presents a compression ratio of M/N with M>N.

According to a specific realization mode, M=4 and N=3. Moreover, the input port of the frame memory operates at a 13.5 Mhz clock frequency while the high speed output port operates at a 27 Mhz frequency. Because of this fact, we obtain luminance data as output which are directly usable for display on the 16/9 television tube, while chrominance data can be used after storage in a buffer memory making it possible to obtain the desired sampling frequency.

According to another characteristic of the present invention, the blocks containing luminance data and blocks containing chrominance data are read simultaneously on the low speed output port of each memory, the memories being inverted at each frame, to obtain an output video data delayed by one image. Because of this, data issued from the low speed output ports can be reinjected as input into the video signal pre-processing circuit to obtain noise reduction for example.

BRIEF DESCRIPTION OF THE DRAWINGS

Other characteristics and advantages of the present invention appear after reading the description given hereunder of a preferential realization mode of the video signal processing method compliant with the present invention as well as a device for implementation of the aforesaid method, the description refers to drawings in the appendix where.

DESCRIPTION OF THE PREFERRED EMBODIMENTS

Figure 1:
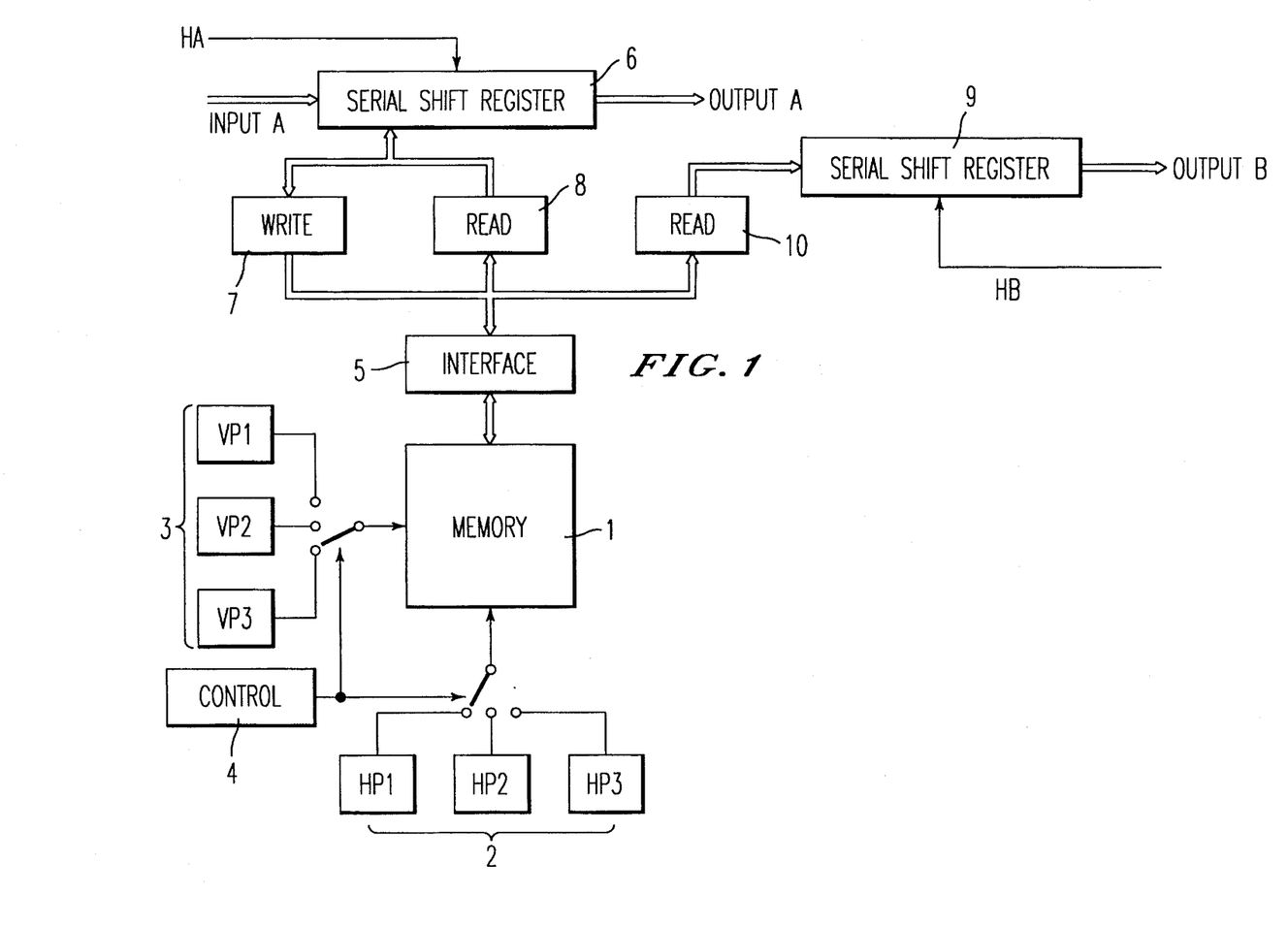
FIG. 1 is a synoptic diagram of a frame memory used in the present invention.

In FIG. 1, we have schematically shown a type of frame memory which can be used in the context of the present invention. This representation is not limiting. The aforesaid memory is a video memory. As shown in FIG. 1, the video memory essentially includes a memory part 1 controlled by horizontal counters 2 and vertical counters 3 piloted by a control circuit 4. More specifically, the horizontal counters 2 are composed of three internal pointers HP1, HP2, HP3 while the vertical counters are composed of three internal pointers VP1, VP2, VP3. Pointers VP1 and HP1 point to the block where input data must be written, pointers VP2 and HP2 point to the block which must be read at serial output A level, while pointers VP3 and HP3 point to the block which must be read on serial output B. Interface 5 is between the input and output registers and the memory FIG. 1. It also includes a serial shift register 6 piloted by a clock HA and which serves as a buffer register for input port A and output port A. This serial shift register 6 is linked to interface 5 by means of write 7 and read 8 maintenance circuits. FIG. 1 also includes a serial shift register 9 piloted by clock HB which serves as a buffer register for output port B and which is connected to interface circuit 5 by means of a read maintenance circuit 10. In this case, the clock frequency of the two input ports and output port A is identical while the clock frequency of the second output port, i.e. port B, is an integer multiple of the clock frequency at input port A. Each port can be addressed by an assembly of two counters, i.e. a counter for columns and a counter for rows. The three available counter assemblies are completely independent as indicated in FIG. 1. In general, one cannot access the memory itself word by word because the access time would be much too long. Because of this, we access the memory by blocks of K words, K being chosen as equal to 12 in the represented realization mode. Thus, when the horizontal counter is incremented by one, we access a new block of 12 words. The incrementation of each counter is controlled in an external fashion by circuit 4. This video memory is used to store a digitized video signal. Consequently, the data contained in the frame memory are constituted by luminance signal samples and chrominance signal samples. Traditionally, chrominance has a sampling frequency lower than that of luminance. In the context of the present invention, the data blocks include either luminance data, or chrominance data, and three blocks of luminance data are interlaced with each block of chrominance data, as explained hereunder with reference to the different timing diagrams.

Figure 2:
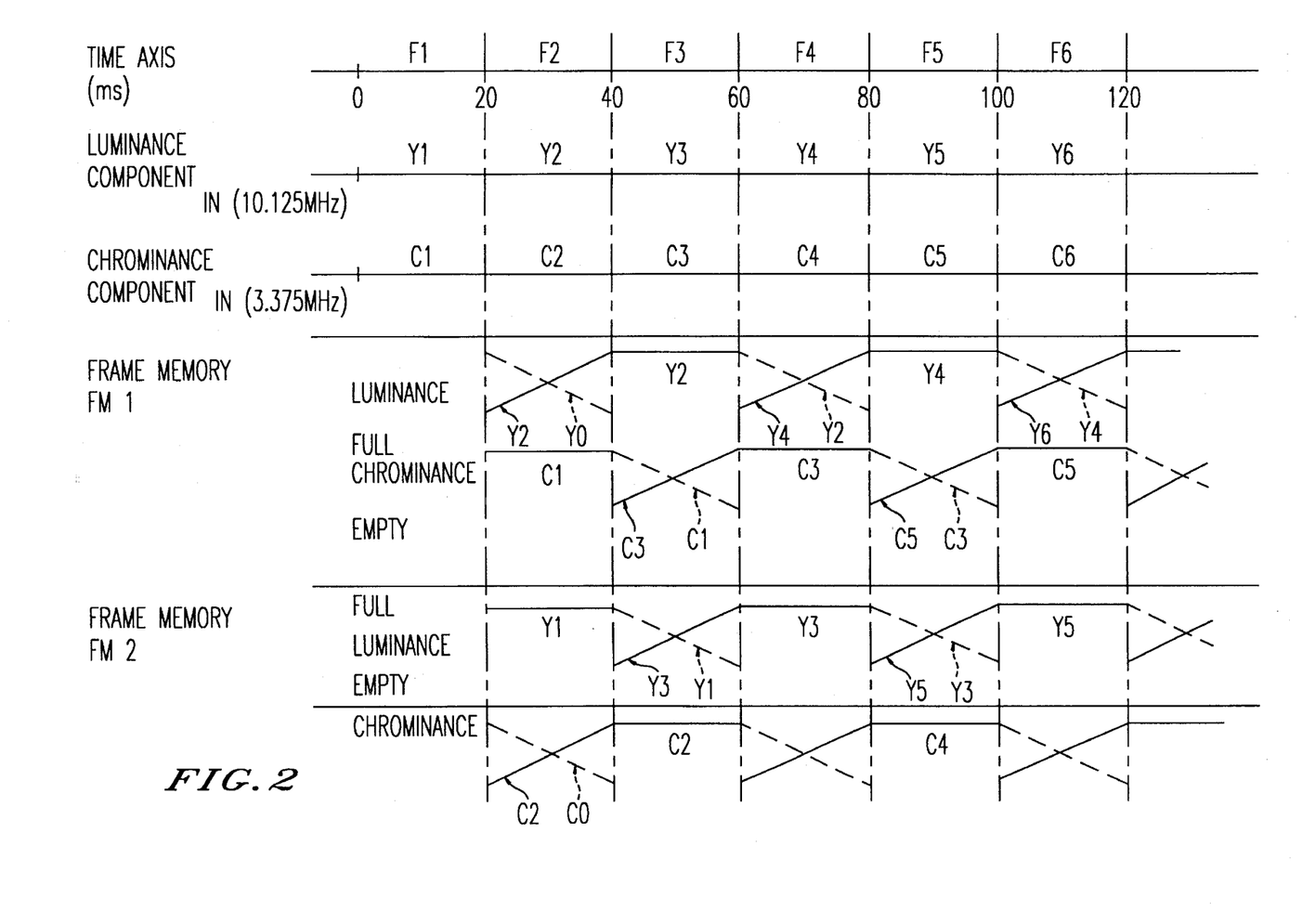
FIG. 2 is a timing diagram representing the contents of different frame memories in function of time.

We will now describe in reference to FIGS. 2 to 6 a realization mode of the video signal processing method which allows display of a 4/3 format signal on a 16/9 format television tube in compliance with the present invention. This processing method applies to a case where the system uses two frame memories. As shown in FIG. 2 each frame F1, F2, F3, F4, F5, F6 has a duration of 20 ms. In the case of a color image, the sampling frequency is divided between the luminance components Y1, Y2, Y3, Y4, Y5, Y6 and chrominance components C1, C2, C3, C4, C5, C6. The luminance sampling frequency is 10.125 Mhz and the chrominance sampling frequency is 3.375 Mhz, (see FIG. 2) which makes it possible to obtain a 13.5 Mhz sampling frequency, i.e., the clock frequency of input port A of a frame memory in the represented realization mode. The organization of data in each frame memory FM1 and FM2 is shown in this FIG. 2. We can see that the video components Y1 and C1 are written separately in the two frame memories.

Figure 3A:
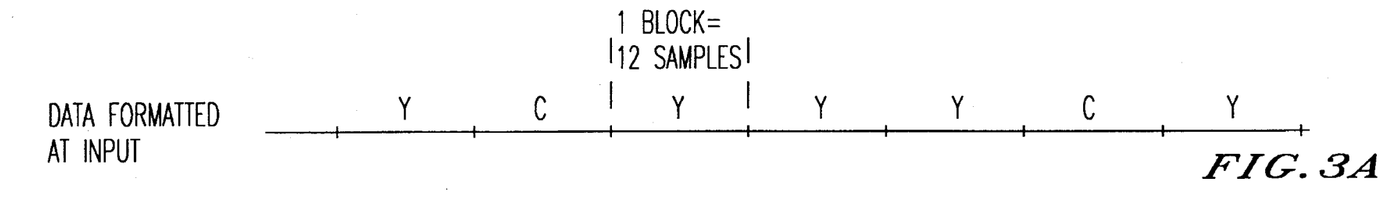
FIGS. 3, 4 and 5 are timing diagrams representing the different control signals of frame memories at the levels of the input port and two output ports respectively.
Figures 3B, 3C:
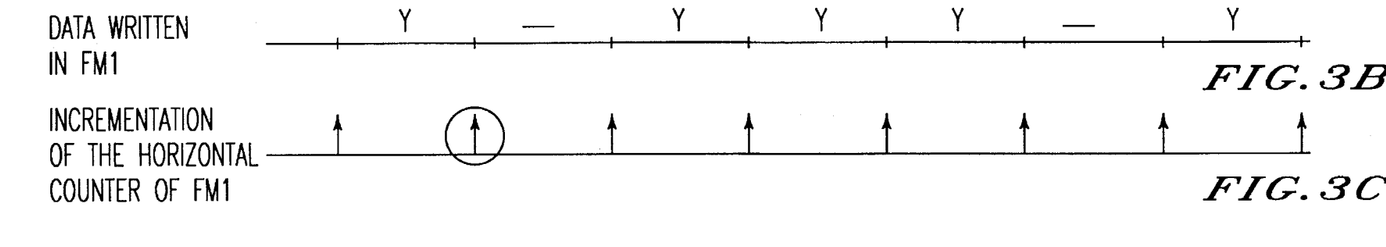
Figures 3D, 3E:
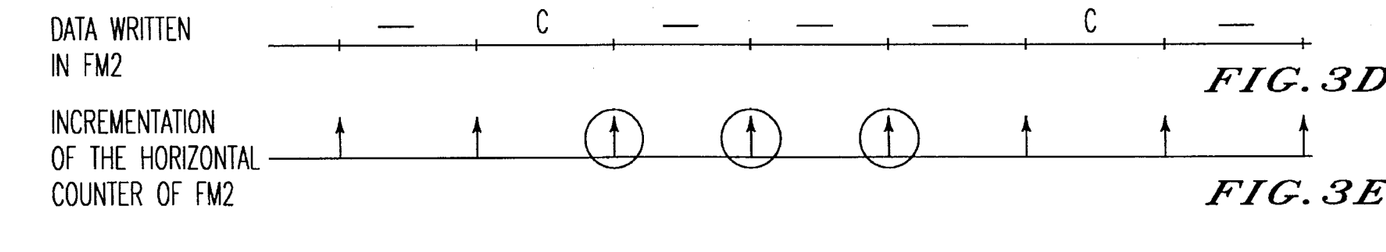
Figure 4A:
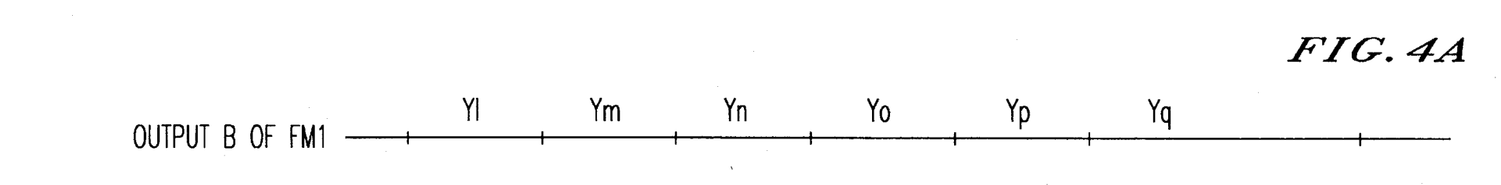
Figure 4B:
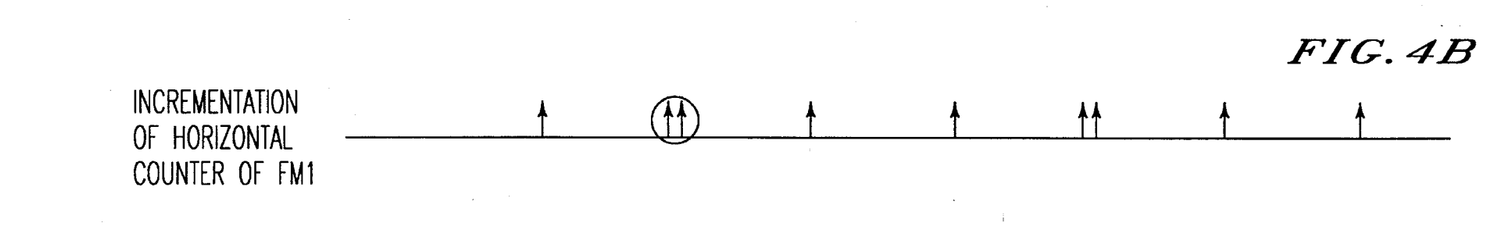
Figure 4C:
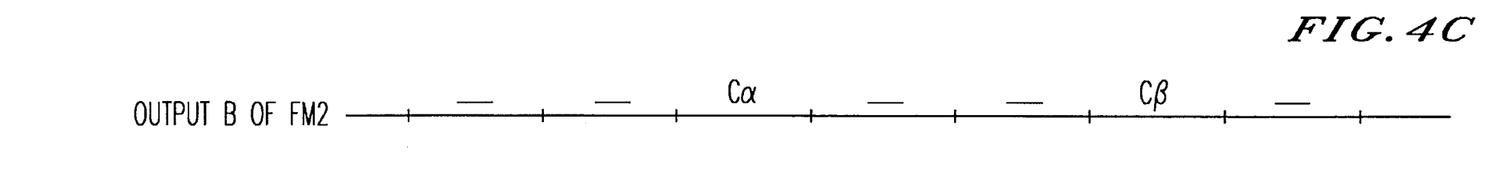
Figure 4D:
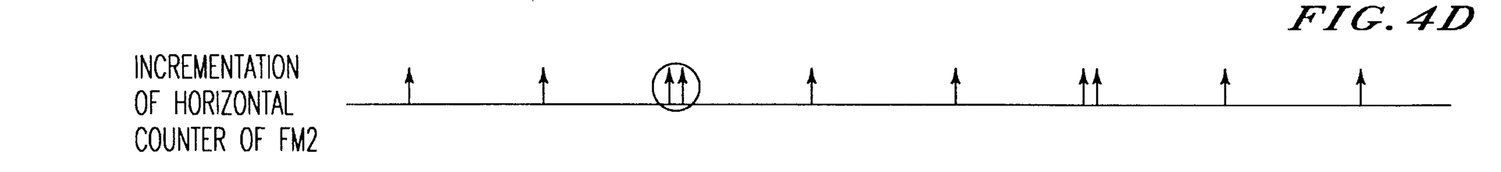
Figure 5A:
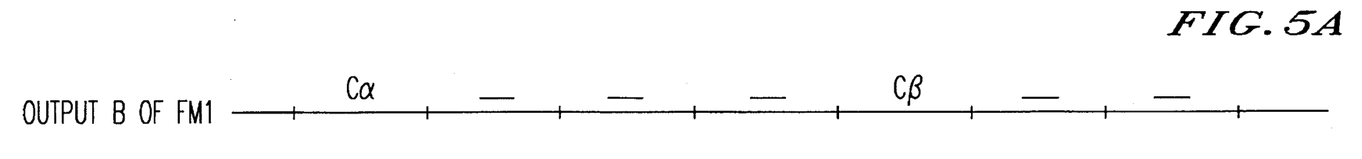
Figure 5B:
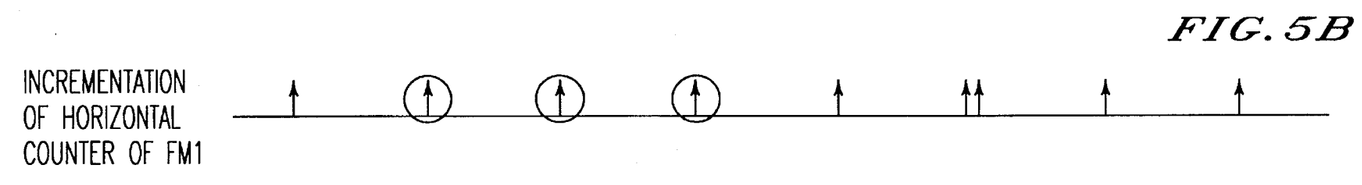
Figure 5C:
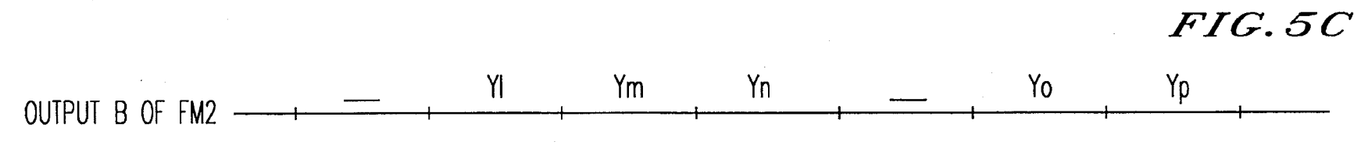
Figure 5D:
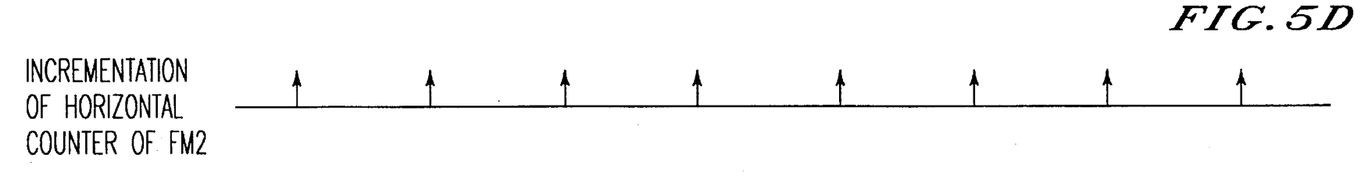

As shown in FIG. 3, the video signal has been digitized and put into the form of 12 sample blocks. The data formatted at input successively include three samples of luminance data Y followed by a sample of chrominance data C, this sequence is repetitive. In compliance with the present invention's method, in the first frame memory FM1, we first write the luminance data. Incrementation of the horizontal counter of FM1 is performed as shown in FIG. 1. At the first counter incrementation we write the Y luminance data block. The counter of FM1 is then incremented but write is not authorized. The input datum is then a chrominance datum, which is not written into frame memory FM1, but is written into frame memory FM2 as shown in FIG. 3. The same is true for all blocks constituting a frame, for example frame F2 in FIG. 2. During the next frame we invert the which memory is enabled to, and does store data, so that luminance and chrominance data are stored in separate memories, and thus write the chrominance data in the memory of frame FM1, these data being represented by C3 in FIG. 2, and the luminance data in the memory of frame FM2, these data being represented by Y3 in FIG. 2. Thus, in compliance with the present invention, one of the frame memories first stores the luminance components of a frame sampled at 10.125 Mhz, while the other frame memory stores the U and V chrominance components of the same frame which are at 3.375 Mhz. When we read the data on the output port B of each frame memory, we thus obtain, for the written data compliant with the diagram shown in FIG. 3, the data shown in FIG. 4. Because of this fact, on the output port B of frame memory FM1, we obtain the luminance components Y1, Ym, Yn, Yo, Yp, Ya in a continuous stream which are output at the instantaneous frequency of 27 Mhz, which corresponds well to a compression ratio of 4/3. In fact, 27=(10.125×2)× (4/3). In this case, the incrementation of the horizontal counter of frame memory FM1 is performed as shown in FIG. 4. Every three pulses, we send two simultaneous control pulses since a chrominance component is interlaced with three luminance components. Simultaneously, we output chrominance components Cα and Cβ on output port B of frame memory FM2. In this case, a block of valid data is output every three blocks at the moment when the horizontal counter incrementation is composed of two pulses. A buffer register is of course necessary to obtain a continuous flow of input at the chrominance data sampling frequency, i.e. 9 Mhz from this 27 Mhz flow.

According to another characteristic of the present invention, the output port A of two frame memories is used to obtain the data which make it possible to perform noise reduction processing. Because of the writing mode used to write in frame memories FM1 and FM2, the luminance component is obtained from a frame memory, while the chrominance component is obtained from the other frame memory, the functions of each memory being inverted at each frame i.e. memory FM1 stores a first luminance data in one frame but when a chrominance data is to be read it is stored in frame memory 2, frame memory 1 being disabled from reading during presentation of chrominance data. The control signals demonstrating the operation of counter incrementations are shown in FIG. 5. The output port A operates at the same frequency as input port A, we respectively obtain on the output port A of each frame memory FM1 and FM2, a chrominance component Cα or Cβ followed by three insignificant blocks and three luminance components Y1, Ym, Yn, Yon Yp, . . . followed by an insignificant block. In this case, the counter is incremented to point to the next blocks, but the data is insignificant. In output from ports A of frame memories FM1 and FM2, we thus obtain the data delayed by one image which can be used for noise reduction or for any other processing by being sent to a preprocessing circuit, as shown hereunder in FIG. 6.

Figure 6:
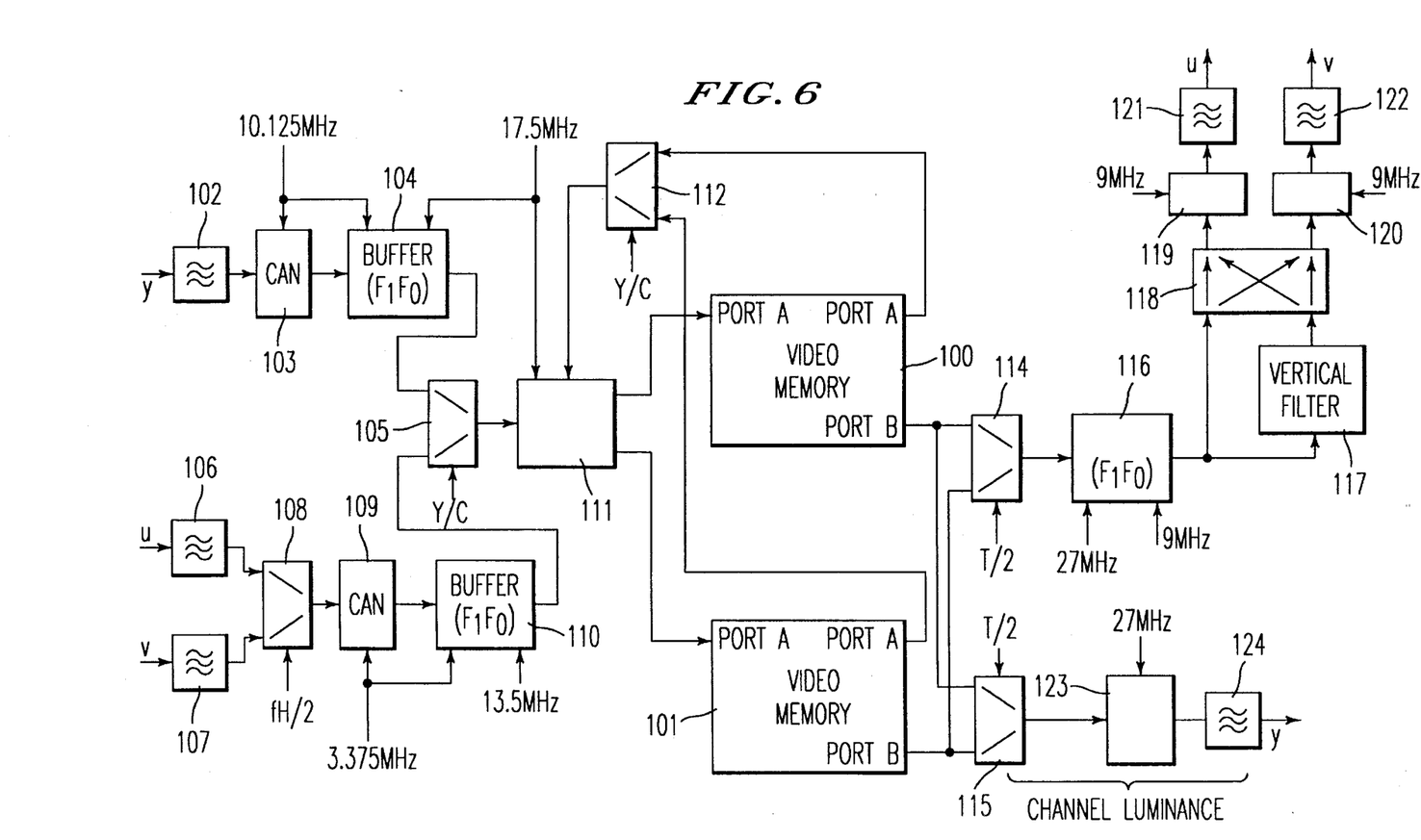
FIG. 6 is a synoptic diagram of a device used for implementation of the processing method in compliance with the present invention.

We will now describe with reference to FIG. 6, a device that allows implementation of the processing method in compliance with the present invention. In the circuits shown in FIG. 6, the luminance and chrominance components of a video signal have first been separated before being processed and stored in video memories FM1 and FM2. As shown in FIG. 6, the circuit that complies with the present invention includes two video memories 100, 101 with three ports, i.e. an input port A operating at a 13.5 Mhz frequency, a low speed output port A operating at a 13.5 Mhz frequency and a high speed output port B operating at a 27 Mhz frequency. The input ports A of video memories 100 and 101 receive digitized signals issued from a signal processing circuit 111. This processing circuit 111 receives as input the luminance Y and chrominance C signals multiplexed in circuit 105 to form a signal at 13.5 mega-samples per second. Before entering into circuit 105, the luminance signal Y is sent to a low pass filter 102 then an analog digital convertor 103 transforms the aforesaid luminance signal into digitized data sampled at a 10.125 Mhz frequency and a FIFO (first in, first out) type buffer circuit 104 entering the data at a 10.125 Mhz frequency and outputting them at a processing frequency of 13.5 Mhz; likewise, before entering into circuit 105 the luminance signals are sent to a low pass filter 106 receiving the chrominance signal U and to a low pass filter 107 receiving chrominance signal V, then to a multiplexer 108 multiplexing signals U and V issued from low pass filters 106 and 107, the multiplexer operating at a frequency FH/2, an analog digital convertor 109 transforming the analog chrominance signals into digital chrominance data sampled at a frequency of 3.375 Mhz, and to a FIFO type buffer circuit 110 whose input operates at 3.375 Mhz frequency and the output at 13.5 Mhz frequency. As shown in FIG. 6, output ports A of memories 100 and 101 are each connected to the input of two multiplexer 112, operating at the frame frequency. The outputs of multiplexer 112 is respectively sent to the signal processing circuit 111 processing circuit, to perform noise reduction by adding the weighted signal of the previous image to the luminance signal or chrominance signal. Moreover, outputs B of video memories 100 and 101 are respectively connected to the inputs of the two multiplexers 114, 115 operating at image frequency T/2. As an output from multiplexer 114, we obtain chrominance data at an instantaneous sampling frequency of 27 Mhz. These chrominance data are input into a FIFO type buffer register 116 which outputs them at the 9 Mhz sampling frequency. The data output from the buffer register are either sent directly, or after passage in a vertical filter 117, to a demultiplexing circuit 118 to separate the chrominance data into chrominance datum U and chrominance datum V. They are each sent to an digital analog convertor 119, 120 operating at 9 Mhz frequency and in a known manner the signals issued from the digital analog convertors 119, 120 are sent to low pass filters 121, 122 to obtain output chrominance signals U and V which can be displayed without distortion on a 16/9 screen. Likewise, as an output from multiplexer 115, we obtain a luminance signal at the sampling frequency of 27 Mhz. This signal is sent to a digital-analog convertor 123 operating at 27 Mhz, then to a low pass filter 124 to obtain a luminance signal that can be directly displayed on a 16/9 screen.

The above described circuit thus makes it possible, by using two frame memories, to perform video signal processing which complies with the present invention. This processing permits display of the video signal on a 16/9 screen without distortion.

We claim:

1. A processing method for a video signal coded in a form of K words, the video signal being written into and read from first and second frame memories each including an input port, and low and high speed output ports, comprising the steps of:

forming an input digital video signal from sets of M blocks with N blocks containing luminance data and M–N blocks containing corresponding chrominance data;

sequentially writing the blocks of luminance and chrominance data of the input digital video signal to the frame memories, wherein for a first frame the luminance data is written to the first frame memory and the corresponding chrominance data is written to the second frame memory, and for a next frame the luminance data is alternately written to the second frame memory and the corresponding chrominance data is alternatively written to the first frame memory, and for further frames further sequentially alternating to which frame memory the luminance data and corresponding chrominance is written; and reading from the output ports of the frame memories blocks containing the luminance data and corresponding chrominance data.

2. The processing method according to claim 1, wherein M=4 and N=3.

3. The processing method according to claim 1, wherein the input port operates at a clock frequency of 13.5 Mhz and the high speed output port operates at a clock frequency of 27 Mhz.

4. The processing method according to any one of claims 1–3, further comprising the step of reading the blocks containing luminance data and the blocks containing corresponding chrominance data simultaneously on the low speed output port of each frame memory to obtain an output video data delayed by one frame.

5. The processing method according to claim 4, wherein the low speed output port operates at a clock frequency of 13.5 Mhz.

6. A processing method for compressing a video signal coded in a form of K words, the video signal being written into and read from first and second frame memories each including an input port, and low and high speed output ports, comprising the steps of:

forming an input digital video signal from sets of M blocks with N blocks containing luminance data and M–N blocks containing corresponding chrominance data;

sequentially writing the blocks of luminance and chrominance data of the input digital video signal to the frame memories, wherein for a first frame the luminance data is sampled at a first frequency and written to the first frame memory and the corresponding chrominance data is sampled at a second frequency which is less than the first frequency and is written to the second frame memory, and for a next frame the luminance data is alternately written to the second frame memory and the corresponding chrominance data is alternatively written to the first frame memory, and for further frames further sequentially alternating to which frame memory the luminance data and corresponding chrominance is written; and reading from the output ports of the frame memories an output signal of blocks containing the luminance data and corresponding chrominance data, the output signal being compressed by a ratio of M/N.

7. The processing method according to claim 6, wherein M=4 and N=3.

8. The processing method according to claim 6, wherein the input port operates at a clock frequency of 13.5 MHz and the high speed output port operates at a clock frequency of 27 MHz.

9. The processing method according to any one of claims 6–8, further comprising the step of reading the blocks containing luminance data and the blocks containing corresponding chrominance data simultaneously on the low speed output port of each frame memory to obtain an output video data delayed by one frame.

10. The processing method according to claim 9, wherein the low speed output port operates at a clock frequency of 13.5 MHz.

11. The processing method according to claim 6, wherein the first frequency is 10.125 MHz and the second frequency is 3.375 MHz.

12. A processing method for compressing a 4/3 format video signal coded in a form of K words, the video signal being written into and read from first and second frame memories each including an input port, and low and high speed output ports, comprising the steps of:

forming an input digital video signal from sets of 4 blocks with 3 blocks containing luminance data and 1 block containing corresponding chrominance data;

sequentially writing the blocks of luminance and chrominance data of the input digital video signal to the frame memories, wherein for a first frame the luminance data is sampled at a first frequency and written to the first frame memory and the corresponding chrominance data is sampled at a second frequency which is less than the first frequency and is written to the second frame memory, and for a next frame the luminance data is alternately written to the second frame memory and the corresponding chrominance data is alternatively written to the first frame memory, and for further frames further sequentially alternating to which frame memory the luminance data and corresponding chrominance is written; and reading from the high-speed output ports of the frame memories an output signal of blocks containing the luminance data and corresponding chrominance data, the output signal being compressed by a ratio of 4/3 to generate a 16/9 format video signal.

13. The processing method according to claim 12, wherein the input port operates at a clock frequency of 13.5 MHz and the high speed output port operates at a clock frequency of 27 MHz.

14. The processing method according to either one of claims 12 or 13, further comprising the step of reading the blocks containing luminance data and the blocks containing corresponding chrominance data simultaneously on the low speed output port of each frame memory to obtain an output video data delayed by one frame.

15. The processing method according to claim 14, wherein the low speed output port operates at a clock frequency of 13.5 MHz.

16. The processing method according to claim 12, wherein the first frequency is 10.125 MHz and the second frequency is 3.375 MHz.

* * * * *